May 20, 1958 W. H. McCORMACK 2,835,749
FEEDBACK AMPLIFIERS
Filed June 17, 1954
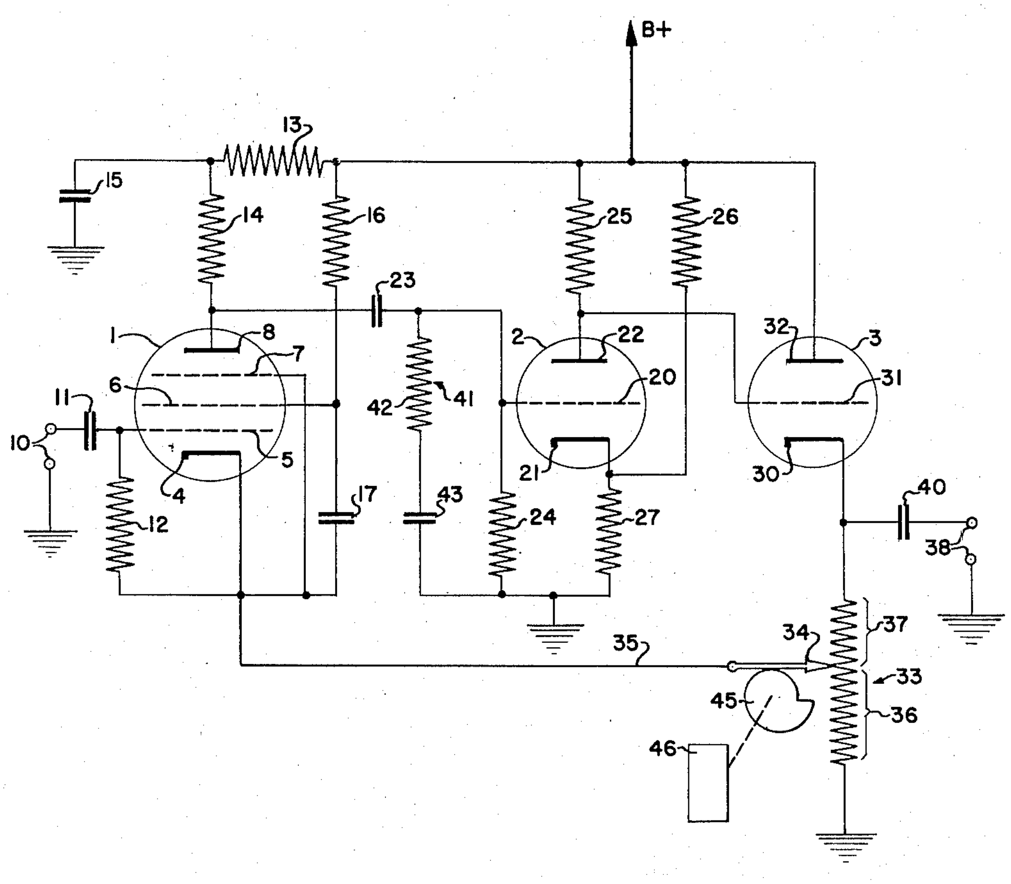
WILLIAM H. MCCORMACK,
INVENTOR.
BY John H. J. Wallace United States Patent Office 2,835,749

Patented May 20, 1958

2,835,749

FEEDBACK AMPLIFIERS

William H. McCormack, Torrance, Calif., assignor to The Garrett Corporation, Los Angeles, Calif., a corporation of California Application June 17, 1954, Serial No. 437,405

2 Claims. (Cl. 179—171)

This invention relates generally to feedback amplifiers, and particularly relates to a stable amplifier with degenerative feedback suitable for dividing an input signal by a fixed or variable quantity.

The feedback amplifier of the present invention is particularly adapted for use in an electronic analogue computing network. Such networks are usually arranged for multiplying or dividing an input signal by successive fixed or variable quantities. Frequently, passive networks are utilized for developing an output voltage which is either multiplied or divided by the variable quantity. Accordingly, it is conventional practice to provide buffer amplifier stages between successive multiplying or dividing passive networks. The buffer stages provide proper isolation between the networks and, usually, are arranged to have a high input impedance and a low output impedance. Due to their high input impedance, a low driving power is required and, on the other hand, their low output impedance effectively provides a low impedance signal source from which varying currents may be obtained without substantially changing the signal voltage. Furthermore, it is usually desired that such a buffer amplifier be not affected by aging of the tubes or by variations of the anode voltage supply. If the amplifier is substantially insensitive to tube aging, the tube may be replaced when necessary without readjustment of the amplifier impedance elements.

It is, accordingly, an object of the present invention to provide an improved stable amplifier having degenerative feedback and which has a very high input impedance and a very low output impedance.

A further object of the invention is to provide a degenerative feedback amplifier which is substantially insensitive to aging of its tubes and to variations of the anode voltage supply.

Another object of the invention is to provide an amplifier of the character referred to, which permits dividing an input signal by a fixed or variable quantity and which serves both as a dividing network in an analogue computer and as a buffer amplifier.

The degenerative feedback amplifier of the present invention has an input impedance which may be as high as 200 million ohms, and an output imepdance which may be as low as 0.1 ohm. The amplifier includes three electron tubes which are coupled in cascade. The input signal is impressed between the control grid of the first electron tube and a fixed potential, such as ground. The anode of the first stage is coupled to the grid of the second stage and again the anode of the second stage is connected to the grid of the third stage. However, the third electron tube is arranged as a cathode follower, that is, the output signal is developed across a cathode impedance element. A point on the cathode impedance element of the last stage is connected to the cathode of the first tube to provide a degenerative feedback path between the third tube and the cathode of the first tube.

The first tube has a large amplification factor, so that the gain of the input signal impressed on its grid substantially equals the gain of the feedback signal impressed on its cathode. Furthermore, as will be more fully explained hereinafter, the resultant gain of the feedback amplifier, including the feedback loop, is proportional to the reciprocal of the feedback loop gain which, in turn, depends on the position of the point on the cathode resistor of the last tube which is connected to the cathode of the first tube. Thus it will readily be seen that if the cathode of the last tube is grounded through a potentiometer, adjustment of the potentiometer tap will divide the input signal in accordance with the position of the tap. This tap may, for example, be controlled in accordance with a measured quantity to divide the input signal by this quantity.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which the single figure is a circuit diagram of a feedback amplifier embodying the present invention.

The feedback amplifier of the present invention includes three cascaded amplifier stages 1, 2 and 3. Amplifier stage 1 preferably is a pentode, as shown. However, pentode 1 may be replaced by any other tube which has a large amplification factor $\mu$ which should be of the order of 1,000. The amplification factor $\mu$ may be defined as the ratio of plate voltage change to the grid voltage change with constant plate current. Pentode 1 has a cathode 4, control grid 5, screen grid 6, suppressor grid 7, and plate or anode 8. The input signal may be impressed through input terminals 10, one of which is grounded and the other connected to the control grid 5 through coupling capacitor 11. Grid leak resistor 12 is connected directly between control grid 5 and cathode 4. The suppressor grid 7 is directly connected to cathode 4, as is conventional. The anode 8 is connected to a suitable anode voltage supply indicated at B+ through resistors 13 and 14. The junction point of resistors 13 and 14 is bypassed to ground by decoupling capacitor 15, so that resistor 14 functions as the anode load resistor, while resistor 13 with capacitor 15 provides a decoupling network. The screen grid 6 is connected to B+ through a dropping resistor 16 and the screen grid is bypassed to cathode 4 through bypass capacitor 17.

The amplified signal developed across anode load resistor 14 is impressed on the control grid 20 of the second amplifier stage 2. The second amplifier stage 2 preferably is a triode as shown, and includes a cathode 21 and an anode 22 in addition to the control grid 20. The anode 8 is coupled to control grid 20 through coupling capacitor 23. Grid leak resistor 24 is connected between control grid 20 and ground. The anode 22 is connected to B+ through anode load resistor 25. The cathode 21 is maintained at a positive potential by means of a voltage divider including resistors 26 and 27 connected serially between B+ and ground. The cathode 21 is connected to the junction point of resistors 26 and 27.

The third amplifier stage 3 may also be a triode as shown, and includes a cathode 30, control grid 31 and anode 32. The anode 22 is directly, that is conductively, connected to the control grid 31. The anode 32 is directly connected to B+ and the cathode 30 is grounded through a cathode resistor 33. The cathode resistor 33 is arranged as a potentiometer and provided with an adjustable or variable tap 34 which is connected through lead 35 to the cathode 4 of the first amplifier stage. Accordingly, a degenerative feedback connection is provided between the third amplifier stage and the cathode 4 of the first amplifier stage. The magnitude of the feedback is determined by the portion 36 of resistor 33 between tap 34 and ground. The other portion of the resistor 33 between cathode 30 and tap 34 is designated by 37.

The output signal is developed across cathode resistor 33 and may be obtained from output terminals 38, one of which is grounded, while the other one may be coupled through coupling capacitor 40 to cathode 30. A frequency selective network 41, including resistor 42 and capacitor 43, is connected between control grid 20 and ground. The frequency selective network 41 functions as a low-pass filter which will attenuate frequencies above a cut-off frequency, and also operates as a phase shift network to prevent undesirable oscillations, as will be more fully explained hereinafter.

If desired, the tap 34 may be varied by means of a cam 45 which is controlled by an instrument schematically indicated at 46. Thus, the tap 34 may be moved in accordance with a function represented by the shape of the cam 45 of a variable quantity which is measured by the instrument 46.

The feedback amplifier of the invention operates as follows: An input signal impressed through input terminals 10 on control grid 5 will be amplified by the pentode 1 and an amplified output signal is developed across the anode load resistor 14. This amplified signal is impressed through coupling capacitor 23 on the control grid 20 of the second amplifier stage 2. Again an amplified output signal is developed across the anode load resistor 25 which is directly impressed on the control grid 31 of the last amplifier stage. Since the last amplifier stage is a cathode follower, its gain is approximately unity. The output signal is developed across the cathode load resistor 33 and is obtained from output terminals 38 which may be coupled across the cathode load resistor.

Let it be assumed that the input signal becomes positive at a certain instant. Accordingly, the plate current of pentode 1 will increase causing a larger voltage drop across the anode load resistor 14, so that the voltage of anode 8 is decreased. This negative signal is impressed by coupling capacitor 23 on the control grid 20, the voltage of which will go in a negative direction. Consequently, the anode current of amplifier 2 is reduced so that its anode 22 will become more positive. This positive signal is directly impressed on control grid 31 causing a larger anode current through the amplifier 3. Since the anode current flows through the cathode resistor 33, the potential of the cathode will raise, causing the output signal obtained from output terminals 38 to go in a positive direction.

A portion of the voltage developed across cathode resistor 33 is impressed through tap 34 and lead 35 on the cathode 4. Hence, it will be seen that the cathode 4 will become more positive at the same time the control grid 5 of tube 1 is made positive by the input signal. Accordingly, it will be obvious that the feedback path, including lead 35, is degenerative, because the input signal causes the cathode to follow the input signal tending to decrease the overall amplification or the resultant gain.

A calculation of the resultant gain $K_r$ of the amplifier, including the feedback, may provide a better understanding of the operation of the amplifier of the invention. Assuming an input voltage $e_i$ to be impressed on input terminals 10, an output voltage $e_o$ will appear at the output terminals 38. The output voltage may be calculated as follows:

$$e_o=(e_iK_1'-e_oK_1''\beta)K_2=e_iK_1'K_2-e_oK_1''K_2\beta \quad (1)$$

In the above equation $K_1'$ is the gain of amplifier 1 for a signal such as the input signal impressed on its control grid; $K_1''$ is the gain of amplifier 1 for a signal such as the feedback signal impressed on cathode 4; and $K_2$ is the gain of the second amplifier stage 2, that is, the gain common to the input and feedback signals. Furthermore, $\beta$ indicates the feedback loop gain. It will be noted that it has been assumed that the gain of amplifier 3 is unity.

By re-arranging Equation 1 we obtain:

$$e_o=e_i\frac{K_1'K_2}{1+K_1''K_2\beta} \quad (2)$$

The resultant gain, $K_r$, may be obtained from Equation 2 as follows:

$$\frac{e_o}{e_i}\equiv K_r=\frac{1}{\frac{1}{K_1'K_2}+\frac{K_1''}{K_1'}\beta}=\frac{1}{\frac{1}{K}+\frac{\mu+1}{\mu}\beta} \quad (3)$$

In Equation 3 $K=K_1'K_2$, that is, the open loop gain of the three amplifiers. In other words, K indicates the gain of the amplifier of the invention if the lead 35 is open. If the open loop gain K of the three amplifier stages is sufficiently large, that is, if the gain K is, for example 2,000, the factor $$\frac{1}{K}$$

in Equation 3 may be neglected. Furthermore, if the amplification factor $\mu$ is sufficiently large, that is, if the amplification factor is, for example between 1,000 and 2,000, the factor $$\frac{\mu+1}{\mu}$$

in Equation 3 may be approximated by one. Under these conditions, Equation 3 may be approximated as follows:

$$K_r\approx\frac{1}{\beta} \quad (4)$$

The feedback loop gain $\beta$ depends on the resistance of the resistors 36 and 37. The resistance of resistor 37 may be indicated by $R_1$ and the resistance of resistor 36 may be identified by $R_2$. Accordingly we obtain:

$$\beta=\frac{R_2}{R_1+R_2}\equiv R_2C \quad (5)$$

The quantity C in Equation 5 is a constant because $R_1+R_2$ remains constant. By combining Formulae 4 and 5, we obtain:

$$K_r\approx\frac{1}{\beta}\propto\frac{1}{R_2} \quad (6)$$

As explained hereinabove, one of the conditions under which the Formula 6 may be approximated includes a large amplification factor of the first amplifier stage 1. This simply means that the gain of the input signal impressed on control grid 5 substantially equals the gain of the feedback signal impressed on cathode 4. Formula 6 clearly shows that the resultant or overall gain of the amplifier is approximately equal to the reciprocal of the feedback loop gain which in turn is proportional to the reciprocal of $R_2$. Hence, the input signal is divided by $R_2$, the resistance of resistor 36. If this resistance is varied in accordance with a measured quantity or a function of such quantity, the input signal may be divided by such a function. Thus, the feedback amplifier of the invention combines a buffer stage with a dividing network.

It may be pointed out that the conductive connection between anode 22 and control grid 31 is not essential to the operation of the amplifier. Instead, a more conventional coupling network may be utilized. It will be noted that the grid leak resistor 12 is directly connected between control grid 5 and cathode 4. Consequently, the grid bias voltage substantially does not vary with the amplitude of either the input signal or the feedback signal. In other words, the grid bias voltage is fixed with respect to the cathode voltage.

The purpose of the frequency selective network 41 is to prevent the amplifier from oscillating. Due to the very large gain of the amplifier without the feedback loop, undesired oscillations may occur at frequencies other than the signal frequency. The frequency selective network 41 functions essentially as a phase shift network which will prevent currents at a certain frequency from being fed back with such a phase as to provide regeneration. It will be noted that, if the frequency selective network 41 is considered as a low-pass filter, it will only attenuate frequencies above a certain level because the resistor 42 always presents a fixed impedance to alternating currents at any frequency.

It will be understood that the circuit specifications of the feedback amplifier of the invention may vary according to the design for any particular application. The following circuit specifications are included, by way of example only, as suitable for an input signal of 400 cycles per second:

| | | |
|---|---|---|
| Pentode **1** | | ½ Type 5702 |
| Triode **2** | | ½ Type 6112 |
| Triode **3** | | ½ Type 6111 |
| Anode voltage source B+ | volts | 250 |
| Capacitor **11** | microfarads | 0.01 |
| Capacitor **15** | do | 0.25 |
| Capacitor **17** | do | 0.022 |
| Capacitor **23** | do | 0.01 |
| Capacitor **43** | micromicrofarads | 300 |
| Capacitor **40** | microfarads | 1 |
| Resistor **12** | ohms | 5,600,000 |
| Resistor **13** | do | 47,000 |
| Resistor **14** | do | 750,000 |
| Resistor **16** | do | 5,600,000 |
| Resistor **42** | do | 2,200 |
| Resistor **24** | do | 5,600,000 |
| Resistor **25** | do | 820,000 |
| Resistor **27** | do | 1,800 |
| Resistor **26** | do | 220,000 |
| Resistor **33** | do | 20,000 |

A feedback amplifier with the above specifications and a resultant gain of eight has been found to have an effective input impedance of 200 million ohms and an output impedance of 0.3 ohm. Accordingly, the amplifier requires an extremely low driving power and provides a low impedance signal source. Thus, the voltage of the output signal will be substantially independent of the required output current. The amplifier of the invention is ideally suited as a combined buffer amplifier and divider network in an electronic analogue computer. Since the amplifier is substantially insensitive to tube aging, the tubes may readily be replaced without the necessity of readjusting the amplifier. Furthermore, the amplifier can tolerate considerable variations of the anode voltage supply.

What is claimed is:

1. A buffer computer amplifier operable to divide an input signal by a variable factor and having a very high input impedance so as to require a low power signal and having a low output impedance, comprising a first vacuum tube having a cathode, a plurality of grid electrodes and an anode, a second vacuum tube having at least a cathode, a control grid and an anode electrode, a third vacuum tube having a cathode, a control grid and an anode, means supplying operating potentials to said tubes, an input circuit connected between the control grid of the first tube and a point of reference potential so as to supply an input signal to the control grid, a high resistance of the order of megohms connected directly between control grid and cathode of said first tube, the cathode and control grid of said second tube being connected to the anode of the first tube and said point of reference potential, respectively, the anode and cathode of said second tube being connected to the control grid of said third tube and said point of reference potential, respectively, an impedance connected between the cathode of said third tube and said point of reference potential, an output circuit coupled across said impedance, means for supplying a variable portion $\beta$ of the voltage across said impedance between the cathode of said first tube and said point of reference potential in the same phase as that of the input signal so as to furnish degenerative feedback, said first tube having an amplification factor of at least about 1,000 so that the gain of the input signal through the first tube is substantially equal to the gain of the feedback signal therethrough, and the open loop gain of said amplifier as a whole being sufficiently large that its reciprocal is very much smaller than $\beta$ and can be neglected, whereby the amplitude of the output signal is dependent substantially only on the portion of the output signal which is fed back and on the ampliude of the input signal and the input impedance of the amplifier is of the order of hundreds of megohms.

2. A buffer computer amplifier operable to divide an input signal by a variable factor and having a very high input impedance so as to require a low power signal and having a low output impedance, comprising a first vacuum tube having a cathode, a plurality of grid electrodes and an anode, a second vacuum tube having a cathode, a control grid and an anode, a third vacuum tube having a cathode, a control grid and an anode, means supplying operating potentials to said tubes, an input circuit connected between the control grid of said first tube and a point of reference potential so as to supply an input signal to the control grid, a high resistance of the order of megohms connected directly between control grid and cathode of said first vacuum tube, a low pass filter connected between the anode and cathode of the first tube and the cathode and control grid of said second tube so as to prevent oscillation of the amplifier, the plate and cathode of said second tube being connected to the control grid of said third tube and said point of reference potential, respectively, a potentiometer having a pair of terminals and a movable tap, said terminals being connected between the cathode of said third tube and the point of reference potential, the output signal of the amplifier being available across said pair of terminals, means for varying the position of the tap of the potentiometer in accordance with said quantity, said tap being directly connected to the cathode of said first tube to supply a degenerative feedback potential of the same phase as the input signal between that cathode and the point of reference potential and of proportion $\beta$ to the output signal, said first tube having an amplification factor of at least about 1,000 so that the gain of the input signal through the first tube is substantially equal to the gain of the feedback signal therethrough, and the open loop gain of said amplifier as a whole being sufficiently large that its reciprocal is very such smaller than $\beta$ and can be neglected, whereby the amplitude of the output signal is dependent substantially only on said variable factor and on the amplitude of the input signal and the input impedance of the amplifier is of the order of hundreds of megohms.

References Cited in the file of this patent

UNITED STATES PATENTS

| | | |
|---|---|---|
| 2,255,804 | Oman | Sept. 16, 1941 |
| 2,488,448 | Townes et al. | Nov. 15, 1949 |
| 2,559,515 | Pourcian | July 3, 1951 |
| 2,581,456 | Swift | Jan. 8, 1952 |
| 2,598,326 | White et al. | May 27, 1952 |
| 2,668,238 | Frink | Feb. 2, 1954 |

U. S. DEPARTMENT OF COMMERCE

PATENT OFFICE

CERTIFICATE OF CORRECTION

Patent No. 2,835,749 William H. McCormack May 20, 1958

It is hereby certified that error appears in the printed specification of the above numbered patent requiring correction and that the said Letters Patent should read as corrected below.

Column 1, line 56, for "imepdance" read -- impedance --; column 3, line 49, for "raise" read -- rise --; column 6, line 18, for "ampliude" read -- amplitude --.

Signed and sealed this 29th day of July 1958.

(SEAL)

Attest:

KARL H. AXLINE

Attesting Officer

ROBERT C. WATSON

Commissioner of Patents